US010215265B2

United States Patent
Yamasaki

(10) Patent No.: US 10,215,265 B2
(45) Date of Patent: Feb. 26, 2019

(54) ELECTRIC LINEAR MOTION ACTUATOR AND ELECTRIC BRAKE SYSTEM

(71) Applicant: NTN Corporation, Osaka (JP)

(72) Inventor: Tatsuya Yamasaki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/915,977

(22) PCT Filed: Aug. 26, 2014

(86) PCT No.: PCT/JP2014/072243
§ 371 (c)(1),
(2) Date: Mar. 2, 2016

(87) PCT Pub. No.: WO2015/033816
PCT Pub. Date: Mar. 12, 2015

(65) Prior Publication Data
US 2016/0201777 A1  Jul. 14, 2016

(30) Foreign Application Priority Data
Sep. 9, 2013  (JP) .................................. 2013-186275

(51) Int. Cl.
*F16H 25/22* (2006.01)
*F16D 55/22* (2006.01)
(Continued)

(52) U.S. Cl.
CPC ......... *F16H 25/2252* (2013.01); *F16D 55/22* (2013.01); *F16D 65/18* (2013.01);
(Continued)

(58) Field of Classification Search
CPC ...... F16D 65/18; F16D 55/22; F16D 2121/24; F16D 2125/50; F16D 2125/40; F16D 2125/48; F16H 25/2252; F16H 25/2418
See application file for complete search history.

(56) References Cited

U.S. PATENT DOCUMENTS 7,635,050 B2 * 12/2009 Yamamoto .............. F16D 65/18
188/72.8
8,136,641 B2 * 3/2012 Wang ...................... F16D 65/18
188/158
(Continued)

FOREIGN PATENT DOCUMENTS

CN        102171486        8/2011
JP        2008-64314       3/2008
(Continued)

OTHER PUBLICATIONS

International Search Report dated Dec. 2, 2014 in corresponding International Application No. PCT/JP2014/072243 (with English translation).

*Primary Examiner* — Xuan Lan Nguyen
(74) *Attorney, Agent, or Firm* — Wenderoth, Lind & Ponack, L.L.P.

(57) ABSTRACT

It is an object of the present invention to improve seal performance in an electric linear motion actuator configured to linearly drive a linear motion member due to the rotation of a rotary shaft. The linear motion member is constituted by a cylindrical member slidably fitted in a housing, and a pressing member coupled to the distal end portion of the cylindrical member so as to close the opening of the distal end of the cylindrical member. The portion of the pressing member coupled to the cylindrical member is located inside of a boot sealing the space between the distal end portion of the housing and the distal end portion of the linear motion member.

15 Claims, 5 Drawing Sheets

(51) Int. Cl.
 F16D 65/18 (2006.01)
 F16H 25/24 (2006.01)
 F16D 121/24 (2012.01)
 F16D 125/40 (2012.01)
 F16D 125/48 (2012.01)
 F16D 125/50 (2012.01)

(52) U.S. Cl.
 CPC ..... *F16H 25/2418* (2013.01); *F16D 2121/24* (2013.01); *F16D 2125/40* (2013.01); *F16D 2125/48* (2013.01); *F16D 2125/50* (2013.01)

(56) References Cited

U.S. PATENT DOCUMENTS

| | | | |
|---|---|---|---|
| 2002/0023807 A1* | 2/2002 | Ortegren | F16D 55/225 188/73.31 |
| 2004/0200676 A1 | 10/2004 | Chang et al. | |
| 2005/0082908 A1 | 4/2005 | Klode et al. | |
| 2011/0175475 A1 | 7/2011 | Makino et al. | |
| 2012/0305344 A1 | 12/2012 | Yamasaki et al. | |
| 2013/0168192 A1* | 7/2013 | Yasui | F16D 65/18 188/72.1 |
| 2014/0290402 A1 | 10/2014 | Yamasaki et al. | |

FOREIGN PATENT DOCUMENTS

| | | |
|---|---|---|
| JP | 2010-65777 | 3/2010 |
| JP | 2010-265989 | 11/2010 |
| JP | 2011-172378 | 9/2011 |
| JP | 2013-96522 | 5/2013 |

\* cited by examiner

ELECTRIC LINEAR MOTION ACTUATOR AND ELECTRIC BRAKE SYSTEM

TECHNICAL FIELD

The present invention relates to an electric linear motion actuator for linearly driving a driven member such as a brake pad, and to an electric brake system in which this electric linear motion actuator is used.

BACKGROUND ART

As electric linear motion actuators of this type including an electric motor as a driving source, electric linear motion actuators as discussed below are known.

In the electric linear motion actuators disclosed in Japanese Unexamined Patent Application Publication No. 2010-65777 and Japanese Unexamined Patent Application Publication No. 2013-96522, planetary rollers are incorporated between a rotary shaft configured to be rotated by an electric motor and an axially movably supported outer ring member, when the rotary shaft rotates, the respective planetary rollers rotate about their axes while revolving around the rotary shaft due to the frictional contact of the planetary rollers with the rotary shaft, and a helical rib formed on the inner diameter surface of the outer ring member engages in a helical groove or circumferential grooves formed in the outer diameter surface of each planetary roller, thereby moving the outer ring member in the axial direction.

In the electric linear motion actuators disclosed in Japanese Unexamined Patent Application Publication Nos. 2010-65777 and 2013-96522 the outer ring member is a cylindrical member having both open ends. In this arrangement, if foreign objects go into the outer ring member from the end opening of the outer ring member on the outboard side of the outer ring member, the biting/entry of the foreign objects into the outer ring member may hinder the rotation of the planetary rollers, so that the outer ring member may not be able to move in the axial direction.

In order to overcome such a problem, in the electric linear motion actuators disclosed in Japanese Unexamined Patent Application Publication Nos. 2010-65777 and 2013-96522, a cap member is press-fitted to the interior of an open end of the outer ring member so as to close the opening of the outer ring member. However, since the cap member made of metal is press-fitted to the outer ring member made of metal, there is a problem regarding the seal performance.

It is possible to overcome such a problem by providing a member made of rubber or resin between the press-fitting surfaces of the cap member and the outer ring member, or by using the cap member made of rubber or resin. However, in case that the driven member configured to be linearly moved by the outer ring member is a brake pad of the electric brake system, the rear surface of the brake pad reaches a high temperature, specifically, 200 to 300 degrees Celsius. As a result thereof, the deterioration of resin or rubber tends to occur so that a problem may occur regarding the durability.

It is an object of the present invention to improve seal performance in an electric linear motion actuator configured to linearly drive a linear motion member due to the rotation of a rotary shaft.

SUMMARY OF THE INVENTION

In order to achieve the above object, the present invention provides an electric linear motion actuator comprising: a housing; a cylindrical linear motion member having a center axis, and slidably incorporated in the housing; a rotary shaft provided on the center axis of the linear motion member, and configured to be rotated by an electric motor; and a rotational motion converting mechanism provided between the rotary shaft and the linear motion member, and configured to convert a rotational motion of the rotary shaft to a linear motion of the linear motion member, characterized in that the linear motion member comprises: a cylindrical member slidably fitted in the housing, and having an open distal end formed with an opening and located on a side of an open end of the housing; and a pressing member coupled to a distal end portion of the cylindrical member which includes the open distal end of the cylindrical member so as to close the opening of the cylindrical member at the open distal end thereof, wherein the actuator further comprises a boot sealing a space between a distal end portion of the housing and a distal end portion of the linear motion member, and wherein a portion of the pressing member coupled to the cylindrical member is located inside of the boot.

The present invention also provides an electric brake system comprising: a brake pad; a disk rotor; and an electric linear motion actuator configured to linearly drive the brake pad such that the brake pad is pressed against the disk rotor, thereby applying a braking force to the disk rotor, characterized in that the electric linear motion actuator comprises the electric linear motion actuator according to the present invention, wherein the brake pad is connected to a closed end wall of the linear motion member of the electric linear motion actuator.

In the electric linear motion actuator according to the present invention, as described above, the pressing member is coupled to the distal end portion of the cylindrical member so as to close the opening of the distal end of the cylindrical member, and the portion of the pressing member coupled to the cylindrical member is located inside of the boot sealing the space between the distal end portion of the housing and the distal end portion of the linear motion member. As a result thereof, the cylindrical member is sealed by the pressing member and the boot.

In this way, since the cylindrical member is sealed by the pressing member and the boot, and the portion of the pressing member coupled to the cylindrical member is located in the sealed space, the seal performance is extremely high. Also in the arrangement in which the pressing member is coupled to the cylindrical member by means of press-fitting, it is possible to obtain excellent seal performance, and thus to prevent foreign objects from going into the linear motion member.

By forming a boot groove for attaching the boot in an outer periphery of the portion of the pressing member coupled to the cylindrical member, the groove including a rear inner side wall defined by the open distal end of the cylindrical member and having a rectangular section, or by forming a boot groove for attaching the boot in an outer diameter surface of the pressing member, it is possible to arrange the portion of the pressing member coupled to the cylindrical member inside of the boot.

If an anti-rotation groove is formed in a distal end surface of the pressing member constituting, together with the cylindrical member, the linear motion member such that an anti-rotation protrusion formed on the brake pad (driven member) is engageable in the anti-rotation groove, by engaging the anti-rotation protrusion of the brake pad in the anti-rotation groove, it is possible to easily keep the linear motion member non-rotatable (rotationally fixed).

In the electric linear motion actuator according to the present invention, the rotational motion converting mechanism may comprise: planetary rollers incorporated between an inner diameter surface of the linear motion member and an outer diameter surface of the rotary shaft; and a carrier rotatable about the rotary shaft, and rotatably supporting the planetary rollers; wherein a helical rib is formed on the inner diameter surface of the linear motion member, wherein each of the planetary rollers is formed on an outer diameter surface of the planetary roller with circumferential grooves which have a same pitch as the helical rib and in which the helical rib can engage, or with a helical groove in which the helical rib can engage, the helical groove having a same pitch as the helical rib and a lead angle different from a lead angle of the helical rib, wherein the planetary rollers are kept in frictional contact with the rotary shaft, and wherein the rotational motion converting mechanism is configured such that when the rotary shaft rotates, due to the frictional contact of the planetary rollers with the rotary shaft, the planetary rollers rotate about axes of the respective planetary rollers while revolving around the rotary shaft, thereby moving the linear motion member in an axial direction.

Effects of the Invention

In the electric linear motion actuator according to the present invention, as described above, the pressing member is coupled to the distal end portion of the cylindrical member so as to close the opening of the distal end of the cylindrical member, and the portion of the pressing member coupled to the cylindrical member is located inside of the boot sealing the space between the distal end portion of the housing and the distal end portion of the linear motion member. Namely, since the cylindrical member is sealed by the pressing member and the boot, and the portion of the pressing member coupled to the cylindrical member is located in the sealed space, it is possible to obtain excellent seal performance in the electric linear motion actuator.

DETAILED DESCRIPTION OF THE INVENTION

Figure 1:
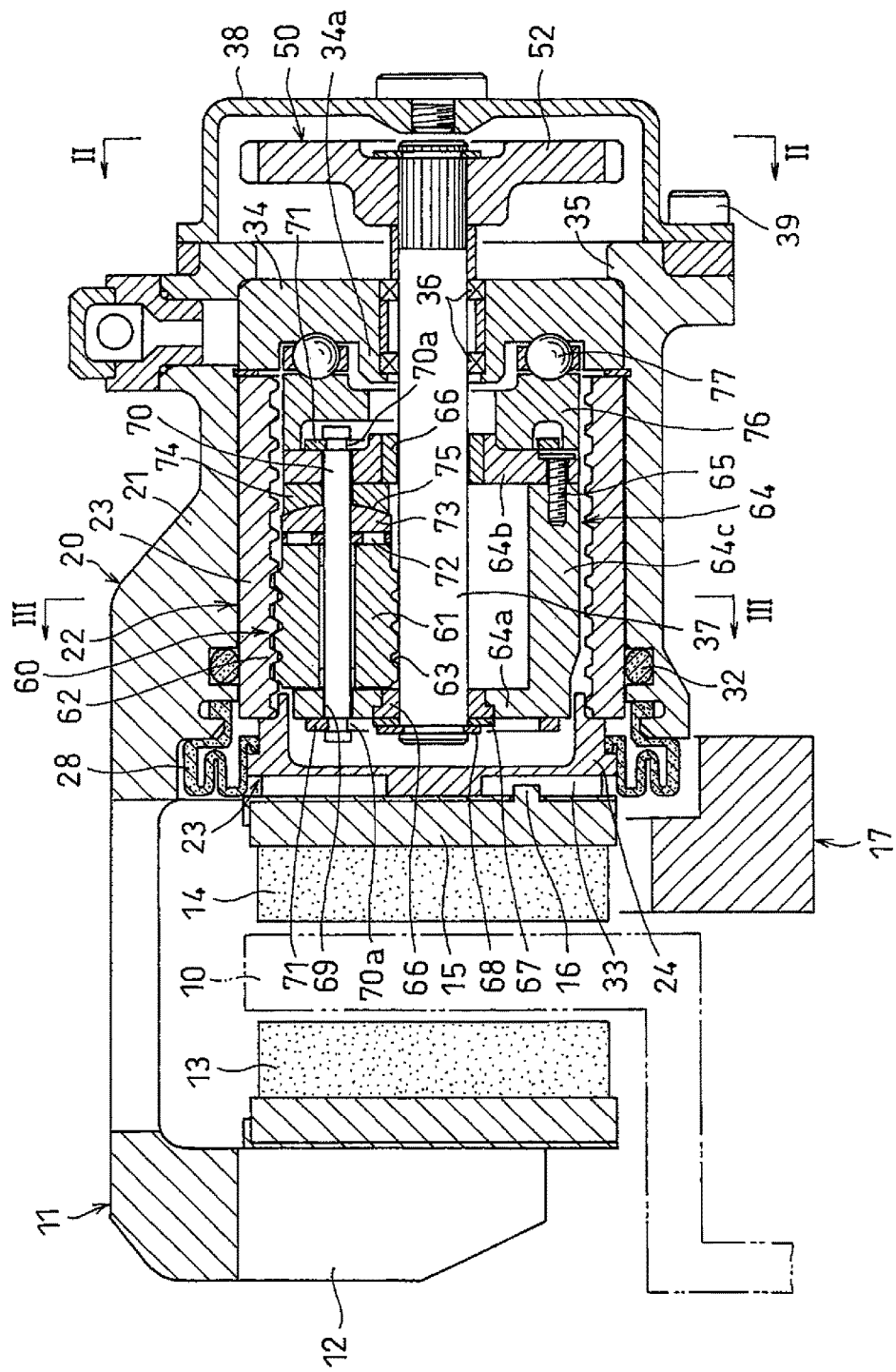
FIG. 1 is a longitudinal sectional view illustrating an embodiment of an electric brake system in which an electric linear motion actuator according to the present invention is used.
Figure 2:
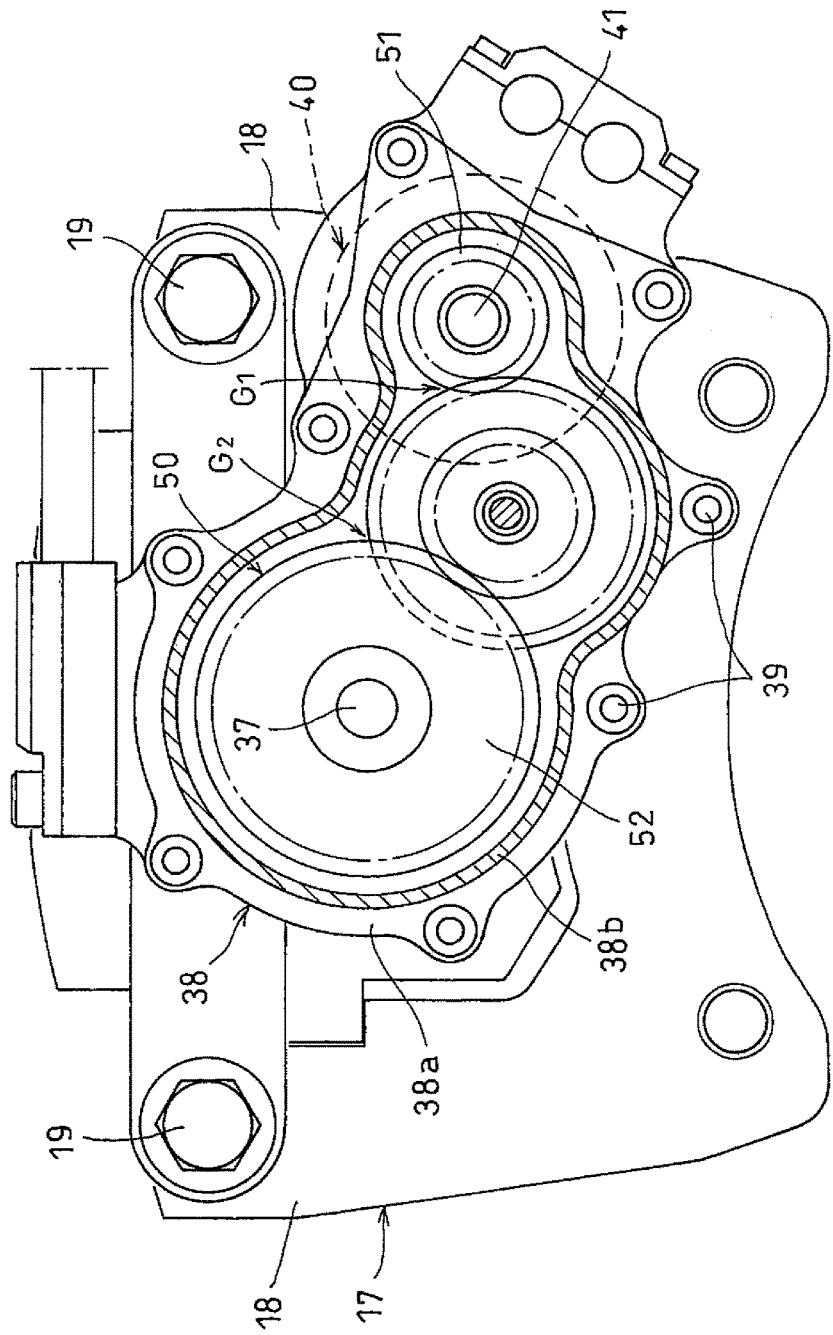
FIG. 2 is a sectional view taken along line II-II of FIG. 1.

The embodiment of the present invention is now described with reference to the drawings. As illustrated in FIGS. 1 and 2, the electric brake system of the embodiment includes a disk rotor 10 configured to rotate together with a wheel (not shown), a caliper 11 provided at the outer peripheral portion of the disk rotor 10, and having a claw portion 12 provided at one end portion of the caliper 11 so as to be axially opposed to the outer peripheral portion of the outboard side surface of the disk rotor 10, and an outboard brake pad 13 supported by the claw portion 12.

The electric brake system further includes an inboard brake pad 14 arranged so as to be opposed to the outer peripheral portion of the inboard side surface of the disk rotor 10, and an electric linear motion actuator 20 provided at the other end portion of the caliper 11 and configured to move the inboard brake pad 14 toward the disk rotor 10.

As illustrated in FIG. 2, a mount 17 is provided near the outer peripheral portion of the inboard side surface of the disk rotor 10. The mount 17 is supported by a knuckle so as to be fixed in position, and is provided on both side portions of the mount 17 with a pair of pin supporting pieces 18 opposed to each other. The pin supporting pieces 18 are each provided with a slide pin 19 extending in the direction orthogonal to the disk rotor 10. The caliper 11 is slidably supported by the slide pins 19.

Though not illustrated in detail in the drawings, the mount 17 supports the outboard and inboard brake pads 13 and 14 such that the brake pads 13 and 14 are movable toward the disk rotor 10, but not rotatable (rotationally fixed).

As illustrated in FIG. 1, the electric linear motion actuator 20 includes a cylindrical housing 21 integral with the other end portion of the caliper 11. A linear motion member 22 is incorporated in the housing 21.

The liner motion member 22 is constituted by a cylindrical member 23 slidably incorporated in the housing 21, and a pressing member 24 coupled to the distal end portion of the cylindrical member 23. The "distal end portion of the cylindrical member 23" is the end portion located at the outboard open end portion of the housing 21.

Figure 4:
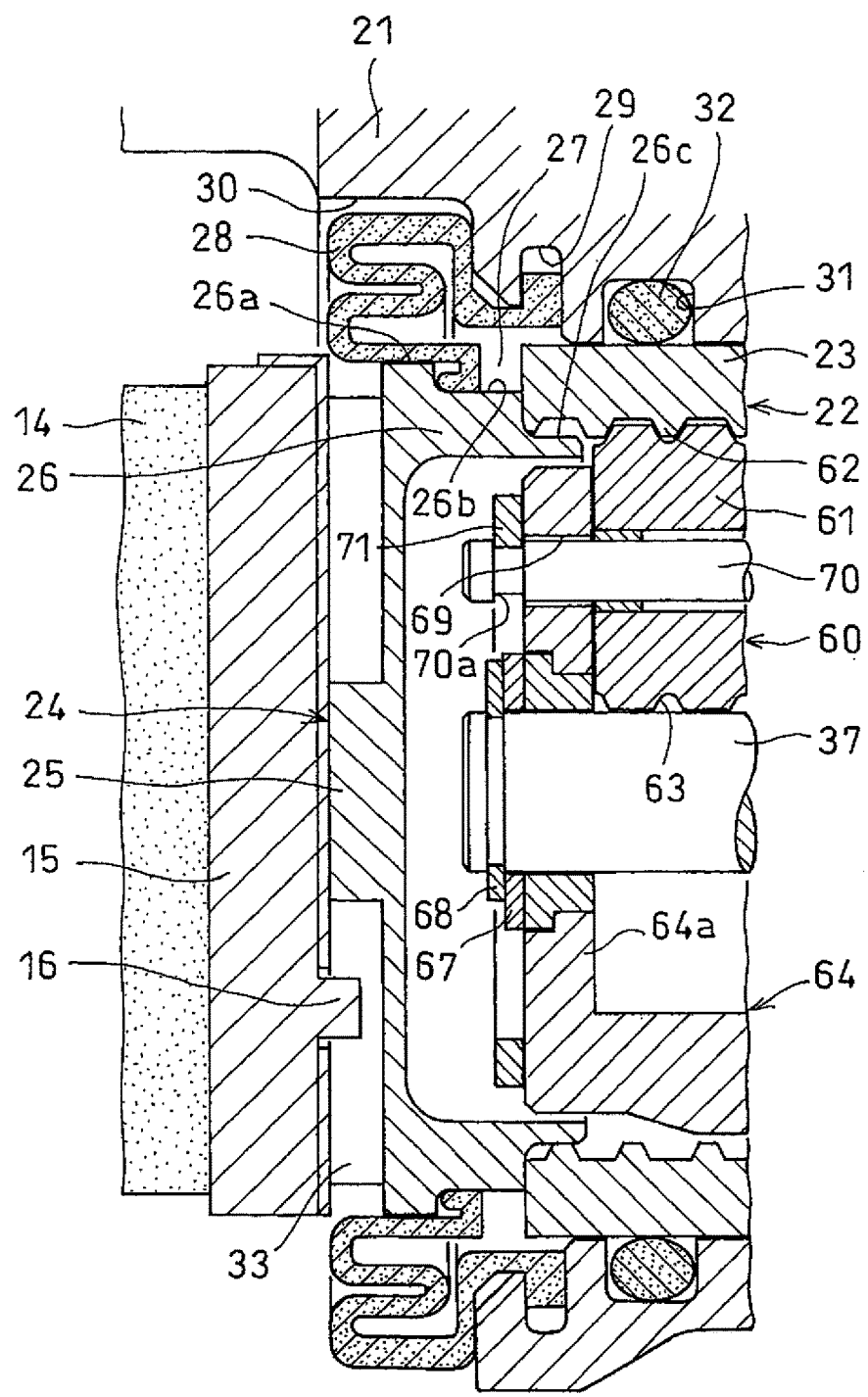
FIG. 4 is an enlarged sectional view illustrating the distal end portion of the linear motion member illustrated in FIG. 1.

As illustrated in FIG. 4, the pressing member 24 is constituted by a disk portion 25, and a cylindrical portion 26 mounted to the outer peripheral portion of one surface of the disk portion 25. The outer diameter surface of the cylindrical portion 26 is stepped to provide axially arranged cylindrical surfaces each having a diameter larger than that of the cylindrical surface adjacent thereto on the side of the open end of the cylindrical portion 26. Specifically, a large diameter cylindrical surface 26a, a medium diameter cylindrical surface 26b, and a small diameter cylindrical surface 26c are axially formed on the cylindrical portion 26. The small diameter cylindrical surface 26c is press-fitted and fixed to the inner diameter surface of the distal end portion of the cylindrical member 23.

By means of the press-fitting of the small diameter cylindrical surface 26c to the inner diameter surface of the distal end portion of the cylindrical member 23 as described above, the cylindrical member 23 and the pressing member 24 are coupled together, thereby closing the distal end opening of the cylindrical member 23. A boot groove 27 is formed in the outer diameter surface of the portion of the pressing member 24 coupled to the cylindrical member 23. The boot groove 27 is defined by the end surface of the cylindrical member 23 at its open end, which constitutes the rear inner side wall of the boot groove 27, the medium diameter cylindrical surface 26b of the pressing member 24, and one of the steps of the pressing member 24 defining the medium diameter cylindrical surface 26b, and thus has a rectangular section.

One end portion of a boot 28 on its small diameter side is attached to the boot groove 27, specifically, to the medium diameter cylindrical surface 26b of the pressing member 24. The other end portion of the boot 28 on its large diameter side is attached to a boot groove 29 formed in the inner periphery of the open end portion of the housing 21 on its outboard side. The space between the open end portion of the housing 21 on its outboard side and the distal end portion of the linear motion member 22 is sealed by attaching the boot 28 to the boot grooves 27 and 29. The portion of the pressing member 24 coupled to the cylindrical member 23 is located inside of the boot 28.

On the outboard side of the boot groove 29, the housing 21 is formed with a recess 30 capable of receiving the boot 28 with the boot 28 contracted. On the inboard side of the boot groove 29, a seal groove 31 is formed in the inner diameter surface of the housing 21. A seal member 32 incorporated in the seal groove 31 is in elastic contact with the outer diameter surface of the cylindrical member 23, thereby sealing the space between the inner diameter surface of the housing 21 and the outer diameter surface of the cylindrical member 23.

Figure 5:
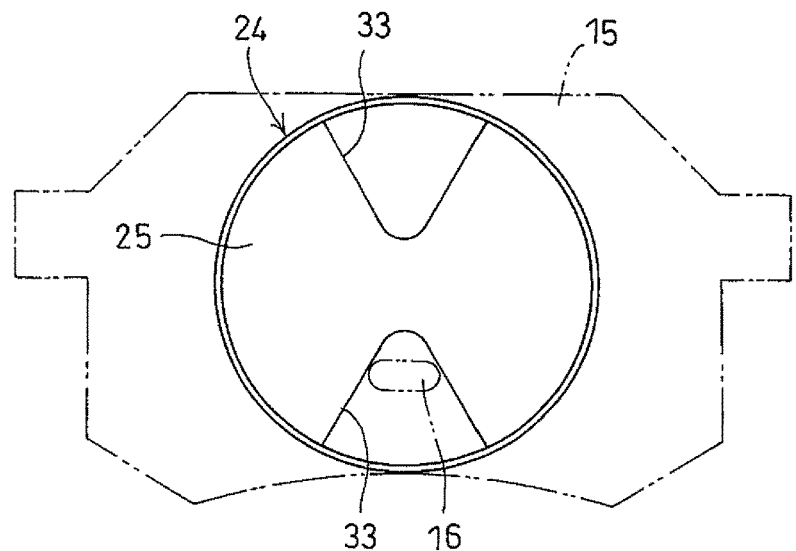
FIG. 5 is a left side view of the pressing member illustrated in FIG. 4.

As illustrated in FIGS. 4 and 5, anti-rotation grooves 33 are formed in the distal end surface of the disk portion 25 of the pressing member 24. A pad holder 15 of the inboard brake pad 14 has anti-rotation protrusions 16 formed on the surface of the holder 15 opposed to the pressing member 24. Due to the engagement of the anti-rotation protrusions 16 in the respective anti-rotation grooves 33, the linear motion member 22 is rotationally fixed to the inboard brake pad 14.

As illustrated in FIG. 1, a shaft supporting member 34 is incorporated in the housing 21 on the inboard side of the inboard end of the linear motion member 22. The shaft supporting member 34 is a disk-shaped member having a boss portion 34a at its center. An annular protrusion 35 is formed on the inner periphery of the inboard end portion of the housing 21 so as to prevent the shaft supporting member 34 from being moved out of the inboard end portion of the housing 21.

A pair of rolling bearings 36 are incorporated in the boss portion 34a of the shaft supporting member 34 so as to be axially spaced apart from each other, and rotatably support a rotary shaft 37 arranged on the center axis of the linear motion member 22.

The inboard end portion of the rotary shaft 37 is located in a gear case 38 attached to the inboard end portion of the hosing 21. As illustrated in FIGS. 1 and 2, the gear case 38 is constituted by a base plate 38a, and a cover 38b covering the surface of the base plate 38a. The gear case 38 is fixed to the housing 21 by means of the fastening of bolts 39 screwed into the inboard end portion of the housing 21 from the surface of the cover 38b.

An electric motor 40 is supported by the base plate 38a of the gear case 38. The electric motor 40 includes a rotor shaft 41 having an end portion located in the gear case 38. The rotation of the rotor shaft 41 is transmitted to the rotary shaft 37 through a reduction gear mechanism 50 incorporated in the gear case 38.

In the reduction gear mechanism 50, the rotation of an input gear 51 attached to the rotor shaft 41 of the electric motor 40 is reduced in speed in a stepwise manner by primary and secondary reduction gear trains $G_1$ and $G_2$, and transmitted to an output gear 52 attached to the end portion of the rotary shaft 37 so as to rotate the rotary shaft 37.

As illustrated in FIG. 1, a rotational motion converting mechanism 60 is provided between the rotary shaft 37 and the linear motion member 22, and the rotational motion of the drive shaft 37 is converted to the axial linear motion of the linear motion member 22 in the rotational motion converting mechanism 60.

Figure 3:
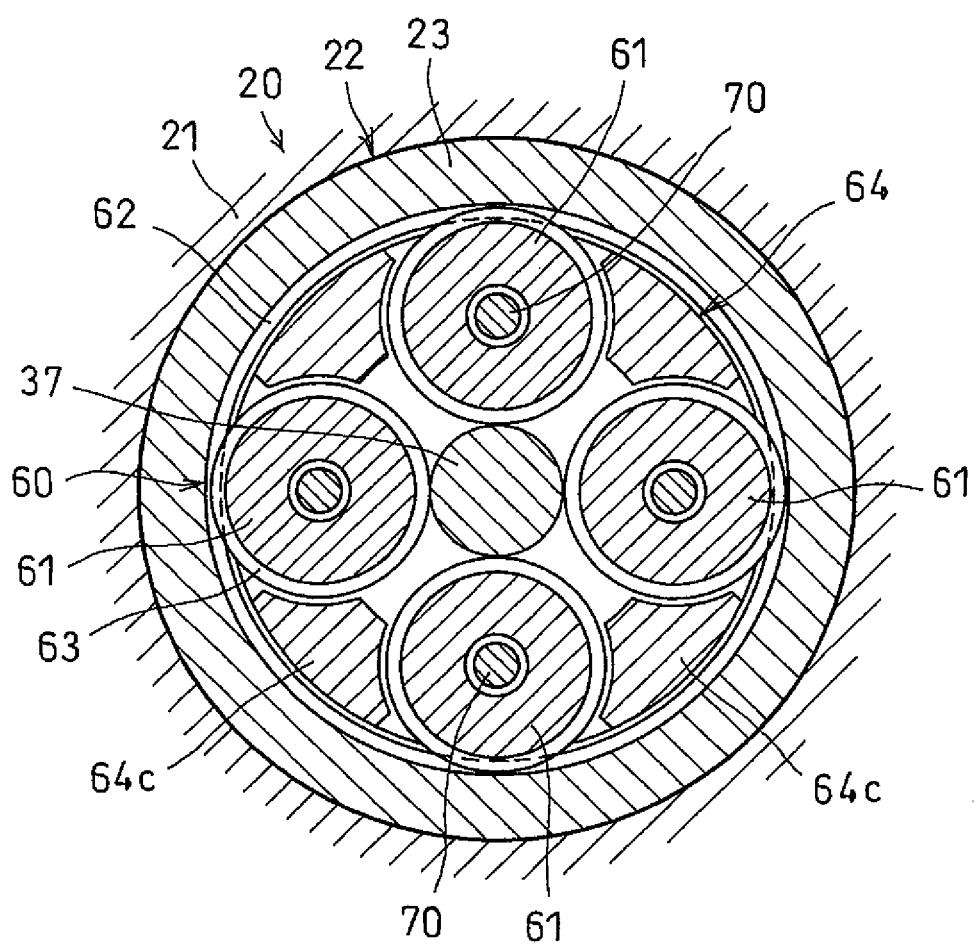
FIG. 3 is a sectional view taken along line III-III of FIG. 1.

As illustrated in FIGS. 1 and 3, the rotational motion converting mechanism 60 includes planetary rollers 61 incorporated between the linear motion member 22 and the rotary shaft 37, and each formed in its outer periphery with a helical groove 63 in which a helical rib 62 formed on the inner periphery of the linear motion member 22 engages, the helical groove 63 having the same pitch as the helical rib 62 and a lead angle different from that of the helical rib 62, whereby when the rotary shaft 37 rotates, due to the contact of the planetary rollers 61 with the rotary shaft 37, the respective planetary rollers 61 rotate about their axes while revolving around the rotary shaft 37, thereby moving the linear motion member 22 in the axial direction. The helical groove 63 of each planetary roller 61 may be replaced by a plurality of circumferential grooves axially equidistantly spaced apart from each other and having the same pitch as the helical rib 62.

The planetary rollers 61 are rotatably supported by a carrier 64 supported so as to be rotatable about the rotary shaft 37. The carrier 64 includes a pair of outboard and inboard disks 64a, 64b axially opposed to each other, and a plurality of space adjusting members 64c provided on the outer peripheral portion of one surface of the disk 64a so as to extend toward the disk 64b and to be circumferentially spaced apart from each other. The disks 64a and 64b are coupled together by means of the fastening of screws 65 screwed into the end surfaces of the respective space adjusting members 64c.

The disks 64a and 64b are rotatably supported by sliding bearings 66 incorporated, respectively, between the disk 64a and the rotary shaft 37 and between the disk 64b and the rotary shaft 37. The sliding bearing 66 rotatably supporting the outboard disk 64a is prevented from separating by a washer 67 fitted at the end portion of the rotary shaft 37 and a snap ring 68 attached at the end portion of the rotary shaft 37.

Each of the disks 64a and 64b is formed with circumferentially spaced apart shaft inserting holes 69 in the form of elongated holes each axially opposed to the corresponding hole 69 formed in the other of the disks 64a and 64b. The respective planetary rollers 61 are rotatably supported by a plurality of roller shafts 70 each having both end portions slidably supported in the corresponding axially opposed pair of shaft inserting holes 69.

The roller shafts 70 extend through the respective disks 64a and 64b at their portions near their ends, and each has ring grooves 70a formed in the outer periphery at the end portions thereof located outwardly of the outer side surfaces of the respective disks 64a and 64b. Elastic rings 71 are wrapped around the respective end portions of the roller shafts 70 so as to come into contact with the bottom surfaces of the corresponding ring grooves 70a.

As illustrated in FIG. 4, each elastic ring 71 is a C-shaped ring having circumferentially opposed separate ends and a rectangular section. The elastic rings 71 are wrapped around the respective end portions of the roller shafts 70 while being radially expanded, and thus have an elastic restoring force by which the elastic rings 71 are radially compressed. This elastic restoring force radially inwardly biases the roller shafts 70, thereby bringing the planetary rollers 61 into pressure contact with the outer diameter surface of the rotary shaft 37. Therefore, when the rotary shaft 37 rotates, the planetary rollers 61 rotate due to the frictional contact of the planetary rollers 61 with the outer diameter surface of the rotary shaft 37.

As illustrated in FIG. 1, from the side of the planetary rollers 61, a thrust bearing 72, a pressure applying plate 73, and a pressure receiving plate 74 are incorporated axially between the inboard disk 64b of the carrier 64 and each planetary roller 61. The pressure applying plate 73 is in contact with the pressure receiving plate 74 through spherical seats 75. A gap is defined between the fitting surfaces of the pressure receiving plate 74 and the corresponding roller shaft 70. The pressure applying plate 73 and the pressure receiving plate 74 are alignable within the gap.

A backup plate 76 and a thrust bearing 77 are incorporated between the inboard disk 64b of the carrier 64 and the shaft supporting member 34, which rotatably supports the rotary shaft 37. The thrust bearing 77 supports the axial reaction force applied to the carrier 64 from the linear motion member 22 through the planetary rollers 61.

The electric brake system of the embodiment is configured as described above. FIG. 1 illustrates the state in which a braking force is not applied to the disk rotor 10, namely, the brake pads 13 and 14 are separated from the disk rotor 10.

In the above state in which a braking force is not applied to the disk rotor 10, when the electric motor 40 illustrated in FIG. 2 is activated, the rotation of the rotor shaft 41 of the electric motor 40 is transmitted to the rotary shaft 37 illustrated in FIG. 1, after reduced in speed in the reduction gear mechanism 50.

Since the outer diameter surfaces of the respective planetary rollers 61 are in elastic contact with the outer diameter surface of the rotary shaft 37, when the rotary shaft 37 rotates, due to the frictional contact of the planetary rollers 61 with the rotary shaft 37, the respective planetary rollers 61 rotate about their axes while revolving around the rotary shaft 37.

At this time, since the helical rib 62, formed on the inner diameter surface of the linear motion member 22, is engaged in the helical grooves 63, formed in the outer diameter surfaces of the respective planetary rollers 61, the linear motion member 22 axially moves due to the engagement of the helical rib 62 in the helical grooves 63, so that the inboard brake pad 14, kept in abutment with the linear motion member 22, abuts the disk rotor 10 and begins to axially press the disk rotor 10. The reaction force generated by this pressing force moves the caliper 11 in the direction in which the outboard brake pad 13, supported by the claw portion 12, approaches the disk rotor 10, so that the outboard brake pad 13 abuts the disk rotor 10. As a result thereof, the outboard brake pad 13 and the inboard brake pad 14 axially strongly sandwich the outer peripheral portion of the disk rotor 10, thereby applying a braking force to the disk rotor 10.

After a braking force is applied to the disk rotor 10, when the rotor shaft 41 of the electric motor 40 is rotated reversely, the linear motion member 22 moves backward until the member 22 reaches the position illustrated in FIG. 1, so that the outboard and inboard brake pads 13 and 14 are separated from the disk rotor 10. As a result thereof, a braking force is not applied to the disk rotor 10.

According to the embodiment of the present invention, since the distal end opening of the cylindrical member 23 is closed by the pressing member 24, which is coupled to the distal end of the cylindrical member 23, and the portion of the pressing member 24 coupled to the cylindrical member 23 is located inside of the boot 28, which seals the space between the distal end portion of the housing 21 and the distal end portion of the linear motion member 22, the cylindrical member 23 is sealed by the pressing member 24 and the boot 28. As a result thereof, it is possible to prevent foreign objects from going into the linear motion member 22, and thus to prevent the malfunction of the electric linear motion actuator which would occur due to the biting/entry of foreign objects into the actuator.

Figure 6:
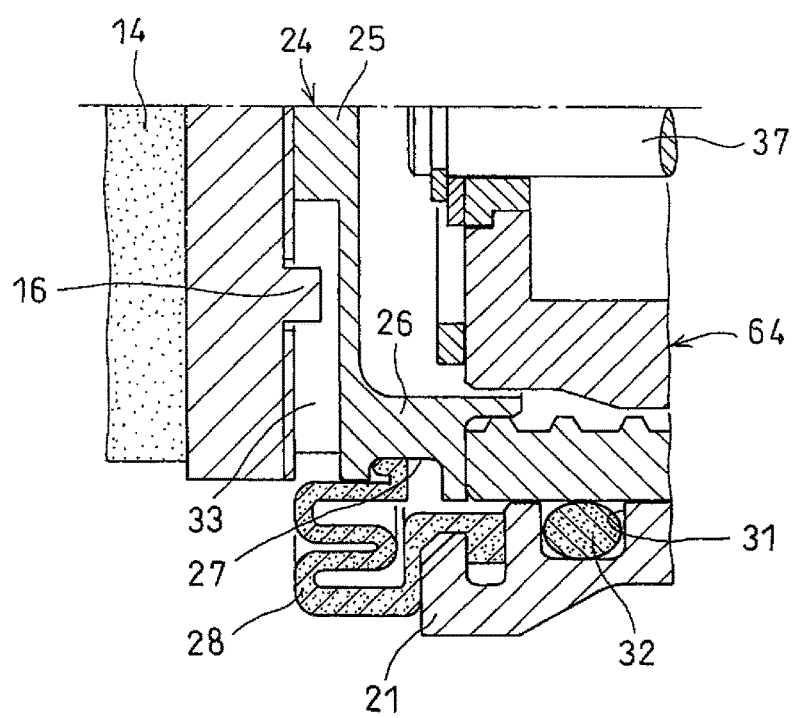
FIG. 6 is a sectional view of a different pressing member.

In FIG. 4, the boot groove 27, to which one end portion of the boot 28 is attached, is formed in the outer periphery of the portion of the pressing member 24 coupled to the cylindrical member 23. However, as illustrated in FIG. 6, the boot groove 27 may a recess formed in the outer diameter surface of the pressing member 24.

DESCRIPTION OF REFERENCE NUMERALS

10: disk rotor
13: brake pad
14: brake pad
16: anti-rotation protrusion
20: electric linear motion actuator
21: housing
22: linear motion member
23: cylindrical member
24: pressing member
27: boot groove
33: anti-rotation groove
37: rotary shaft
40: electric motor
60: rotational motion converting mechanism
61: planetary roller
62: helical rib
63: helical groove
64: carrier

The invention claimed is:
1. An electric linear motion actuator comprising:
a housing;
a cylindrical linear motion member having a center axis, and slidably incorporated in the housing;
a rotary shaft provided on the center axis of the cylindrical linear motion member, and configured to be rotated by an electric motor; and
a rotational motion converting mechanism provided between the rotary shaft and the cylindrical linear motion member, and configured to convert a rotational motion of the rotary shaft to a linear motion of the cylindrical linear motion member,
wherein the cylindrical linear motion member comprises:
a cylindrical member slidably fitted in the housing, and having an open distal end formed with an opening and located on a side of an open end of the housing; and
a pressing member coupled to a distal end portion of the cylindrical member which includes the open distal end of the cylindrical member so as to close the opening of the cylindrical member at the open distal end thereof, the pressing member comprising a disk portion and a cylindrical portion extending from an outer peripheral portion of one axial side of the disk portion, the cylindrical portion having an axial end, the cylindrical portion further having an outer diameter surface including a large-diameter cylindrical surface portion, a medium-diameter cylindrical surface portion having a diameter smaller than a diameter of the large-diameter cylindrical surface portion such that a radially-extending step is formed between the large-diameter cylindrical surface portion and the medium-diameter cylindrical surface portion, the medium-diameter cylindrical surface portion being located axially closer to the axial end of the cylindrical portion than is the large-diameter cylindrical surface portion, and a small-diameter cylindrical surface portion having a diameter smaller than a diameter of the medium-diameter cylindrical surface portion and located axially closer to the axial end of the cylindrical portion than is the medium-diameter cylindrical surface portion, the small-diameter cylindrical surface portion being press-fitted and fixed to an inner diameter surface of the distal end portion of the cylindrical member, wherein the actuator further comprises a boot sealing a space between a distal end portion of the housing and a distal end portion of the cylindrical linear motion member, wherein a boot groove is formed of (i) a groove front wall defined by the step between the large-diameter cylindrical surface portion and the medium-diameter cylindrical surface portion, (ii) a groove bottom wall defined by the medium-diameter cylindrical surface portion, and (iii) a groove rear wall defined by an axial face of the distal end portion of the cylindrical member protruding radially outward beyond the medium-diameter cylindrical surface portion, the boot having a small-diameter end attached to the medium diameter cylindrical surface portion within the boot groove, and wherein a portion of the pressing member coupled to the cylindrical member is located inside of the boot.

2. The electric linear motion actuator according to claim 1, wherein the boot groove has a rectangular section.

3. The electric linear motion actuator according to claim 1, wherein the pressing member is coupled to the cylindrical member by means of press-fitting of a rear end portion of the pressing member to an inner diameter surface of the distal end portion of the cylindrical member.

4. The electric linear motion actuator according to claim 1, wherein an anti-rotation groove is formed in a distal end surface of the pressing member such that an anti-rotation protrusion formed on a driven member is engageable in the anti-rotation groove.

5. The electric linear motion actuator according to claim 1, wherein the rotational motion converting mechanism comprises:
   planetary rollers incorporated between an inner diameter surface of the cylindrical linear motion member and an outer diameter surface of the rotary shaft; and
   a carrier rotatable about the rotary shaft, and rotatably supporting the planetary rollers;
   wherein a helical rib is formed on the inner diameter surface of the cylindrical linear motion member,
   wherein each of the planetary rollers is formed on an outer diameter surface of the planetary roller with circumferential grooves which have a same pitch as the helical rib and in which the helical rib engages, or with a helical groove in which the helical rib engages, the helical groove having a same pitch as the helical rib and a lead angle different from a lead angle of the helical rib,
   wherein the planetary rollers are kept in frictional contact with the rotary shaft, and
   wherein the rotational motion converting mechanism is configured such that when the rotary shaft rotates, due to the frictional contact of the planetary rollers with the rotary shaft, the planetary rollers rotate about axes of the respective planetary rollers while revolving around the rotary shaft, thereby moving the cylindrical linear motion member in an axial direction.

6. An electric brake system comprising:
a brake pad;
a disk rotor; and
an electric linear motion actuator configured to linearly drive the brake pad such that the brake pad is pressed against the disk rotor, thereby applying a braking force to the disk rotor, wherein the electric linear motion actuator comprises the electric linear motion actuator according to claim 1, and wherein the brake pad is connected to a closed end wall of the cylindrical linear motion member of the electric linear motion actuator.

7. The electric linear motion actuator according to claim 2, wherein the pressing member is coupled to the cylindrical member by means of press-fitting of a rear end portion of the pressing member to an inner diameter surface of the distal end portion of the cylindrical member.

8. The electric linear motion actuator according to claim 2, wherein an anti-rotation groove is formed in a distal end surface of the pressing member such that an anti-rotation protrusion formed on a driven member is engageable in the anti-rotation groove.

9. The electric linear motion actuator according to claim 3, wherein an anti-rotation groove is formed in a distal end surface of the pressing member such that an anti-rotation protrusion formed on a driven member is engageable in the anti-rotation groove.

10. The electric linear motion actuator according to claim 2, wherein the rotational motion converting mechanism comprises:
    planetary rollers incorporated between an inner diameter surface of the cylindrical linear motion member and an outer diameter surface of the rotary shaft; and
    a carrier rotatable about the rotary shaft, and rotatably supporting the planetary rollers;
    wherein a helical rib is formed on the inner diameter surface of the cylindrical linear motion member,
    wherein each of the planetary rollers is formed on an outer diameter surface of the planetary roller with circumferential grooves which have a same pitch as the helical rib and in which the helical rib engages, or with a helical groove in which the helical rib engages, the helical groove having a same pitch as the helical rib and a lead angle different from a lead angle of the helical rib,
    wherein the planetary rollers are kept in frictional contact with the rotary shaft, and
    wherein the rotational motion converting mechanism is configured such that when the rotary shaft rotates, due to the frictional contact of the planetary rollers with the rotary shaft, the planetary rollers rotate about axes of the respective planetary rollers while revolving around the rotary shaft, thereby moving the cylindrical linear motion member in an axial direction.

11. The electric linear motion actuator according to claim 3, wherein the rotational motion converting mechanism comprises:
    planetary rollers incorporated between an inner diameter surface of the cylindrical linear motion member and an outer diameter surface of the rotary shaft; and
    a carrier rotatable about the rotary shaft, and rotatably supporting the planetary rollers;
    wherein a helical rib is formed on the inner diameter surface of the cylindrical linear motion member,
    wherein each of the planetary rollers is formed on an outer diameter surface of the planetary roller with circumferential grooves which have a same pitch as the helical rib and in which the helical rib engages, or with a helical groove in which the helical rib engages, the helical groove having a same pitch as the helical rib and a lead angle different from a lead angle of the helical rib, wherein the planetary rollers are kept in frictional contact with the rotary shaft, and wherein the rotational motion converting mechanism is configured such that when the rotary shaft rotates, due to the frictional contact of the planetary rollers with the rotary shaft, the planetary rollers rotate about axes of the respective planetary rollers while revolving around the rotary shaft, thereby moving the cylindrical linear motion member in an axial direction.

12. An electric brake system comprising:

a brake pad;

a disk rotor; and an electric linear motion actuator configured to linearly drive the brake pad such that the brake pad is pressed against the disk rotor, thereby applying a braking force to the disk rotor, wherein the electric linear motion actuator comprises the electric linear motion actuator according to claim 2, and wherein the brake pad is connected to a closed end wall of the cylindrical linear motion member of the electric linear motion actuator.

13. An electric brake system comprising:

a brake pad;

a disk rotor; and an electric linear motion actuator configured to linearly drive the brake pad such that the brake pad is pressed against the disk rotor, thereby applying a braking force to the disk rotor, wherein the electric linear motion actuator comprises the electric linear motion actuator according to claim 3, and wherein the brake pad is connected to a closed end wall of the cylindrical linear motion member of the electric linear motion actuator.

14. An electric brake system comprising:

a brake pad;

a disk rotor; and an electric linear motion actuator configured to linearly drive the brake pad such that the brake pad is pressed against the disk rotor, thereby applying a braking force to the disk rotor, wherein the electric linear motion actuator comprises the electric linear motion actuator according to claim 4, and wherein the brake pad is connected to a closed end wall of the cylindrical linear motion member of the electric linear motion actuator.

15. An electric brake system comprising:

a brake pad;

a disk rotor; and an electric linear motion actuator configured to linearly drive the brake pad such that the brake pad is pressed against the disk rotor, thereby applying a braking force to the disk rotor, wherein the electric linear motion actuator comprises the electric linear motion actuator according to claim 5, and wherein the brake pad is connected to a closed end wall of the cylindrical linear motion member of the electric linear motion actuator.

* * * * *